United States Patent
Sampath

(10) Patent No.: US 8,320,352 B2
(45) Date of Patent: Nov. 27, 2012

(54) ROBUST TRANSMISSION SCHEME FOR WIRELESS NETWORKS

(75) Inventor: Ashwin Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1209 days.

(21) Appl. No.: 11/681,645

(22) Filed: Mar. 2, 2007

(65) Prior Publication Data

US 2008/0212460 A1 Sep. 4, 2008

(51) Int. Cl.
*H04J 1/00* (2006.01)
(52) U.S. Cl. ............... 370/343; 370/319; 370/344
(58) Field of Classification Search ............ 370/458, 370/328, 389, 473, 445, 203, 321, 337, 347, 370/329, 330, 322, 341, 348, 208, 209, 431, 370/433, 436, 437, 442–444, 447, 449, 455, 370/459, 461, 462, 468; 455/452.1, 443–455, 455/464
See application file for complete search history.

(56) References Cited

U.S. PATENT DOCUMENTS

| | | | |
|---|---|---|---|
| 6,473,467 B1 * | 10/2002 | Wallace et al. | 375/267 |
| 6,504,832 B1 | 1/2003 | Koo et al. | |
| 6,591,106 B1 | 7/2003 | Zirwas | |
| 6,947,748 B2 | 9/2005 | Li et al. | |
| 6,973,063 B1 * | 12/2005 | Sourour | 370/335 |
| 7,133,395 B2 * | 11/2006 | Simonsen et al. | 370/345 |
| 7,424,029 B1 * | 9/2008 | Shum | 370/445 |
| 2003/0227889 A1 * | 12/2003 | Wu et al. | 370/335 |
| 2005/0272432 A1 * | 12/2005 | Ji et al. | 455/449 |
| 2006/0039274 A1 | 2/2006 | Park et al. | |
| 2006/0056404 A1 * | 3/2006 | Mueckenheim et al. | 370/389 |
| 2007/0165731 A1 * | 7/2007 | Xiao et al. | 375/260 |
| 2007/0211672 A1 * | 9/2007 | Song et al. | 370/335 |
| 2009/0303937 A1 | 12/2009 | Sawahashi et al. | |

FOREIGN PATENT DOCUMENTS

| | | |
|---|---|---|
| JP | 11504779 | 4/1999 |
| JP | 2000308123 A | 11/2000 |
| WO | 9712489 | 4/1997 |
| WO | 2006099545 | 9/2006 |
| WO | WO2006134946 A1 | 12/2006 |

OTHER PUBLICATIONS

International Preliminary Report on Patentability—PCT/US07/068974, International Search Authority—European Patent Office.

(Continued)

*Primary Examiner* — Ajit Patel
*Assistant Examiner* — San Htun
(74) *Attorney, Agent, or Firm* — Dang M. Vo

(57) ABSTRACT

Systems and methods are described that facilitate assigning a predefined manner in which interfering transmissions may be fully or partially orthogonalized, as well as transmission time periods during which the orthogonalization protocol(s) may be employed. Depending on interference conditions, flexible resource reuse may be implemented to mitigate interference without unduly taxing resources. The subject of the innovation may be employed in, for instance, an ad hoc or unplanned/semi-planned wireless communication environment.

53 Claims, 13 Drawing Sheets

OTHER PUBLICATIONS

Bedekar, et al.: "Downlink Scheduling in CDMA Data Networks," Global Telecommunications Conference. 1999. Globecom '99, pp. 2653-2657, vol. 5.

Ghasemi, et al.: "Distributed Intercell Coordination Through Time Reuse Patitioning in Downlink CDMA," Wireless Communications and Networking Conference, Mar. 21-25, 2004, pp. 1992-1997, vol. 4.

International Search Report—PCT/US2007/068974, International Search Authority—European Patent Office—Mar. 20, 2008.

Written Opinion—PCT/US2007/068974, International Search Authority—European Patent Office—Mar. 20, 2008.

Taiwan Search Report—TW096118976—TIPO—Dec. 5, 2011.

* cited by examiner

ROBUST TRANSMISSION SCHEME FOR WIRELESS NETWORKS

BACKGROUND

I. Field

The following description relates generally to wireless communications, and more particularly to reducing interference in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems.

Most 3G cellular systems, including those based on CDMA, allow universal frequency reuse. While this achieves high capacity in such systems, design and data rate choices assume planning and a somewhat "regular" geographical deployment to ensure that worst-case interference is above a threshold. Ad hoc wireless networks wherein little to no planning is undertaken are gaining in popularity, especially in the context of wireless LANs. Since interference conditions are unpredictable in such cases, often such networks rely on complete interference avoidance in the MAC layer and tend to have lower capacity due to poor reuse. Accordingly, a need in the art exists for systems and/or methodologies that facilitate reducing interference and improving throughput in a wireless communication environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with various aspects described herein, flexible interference avoidance techniques may comprise evaluating features of received signals and providing a degree of orthogonality to mitigate interference associated with the signals, wherein the degree of orthogonality is commensurate to the degree of interference. Scalable interference control may be provided on both the forward link and the reverse link. Variable degrees of orthogonalization may be provided based on detected levels of interference, which may be inferred for a forward link as a function of dynamic rate control (DRC) information provided by an access terminal, and on the reverse link as a function of, for instance, reverse activity information provided by an access point.

According to related aspects, a method of using a robust transmission protocol in a wireless communication environment is provided. The method comprises defining robust transmission time period (RTTP) resources for at least one access point, the RTTP resources identifying a location of at least one RTTP slot. The method also comprises executing an orthogonalization protocol during one or more RTTP slots. The RTTP slots can be defined as potential candidates during which the orthogonalization protocol could be executed.

Another aspect relates to an apparatus for using a robust transmission protocol. The apparatus comprises a means for defining robust transmission time period (RTTP) resources. The RTTP resources can identify a location of at least one RTTP slot. The apparatus can also comprise a means for executing an orthogonalization protocol during one or more RTTP slots. The RTTP slots can be defined as potential candidates during which the orthogonalization protocol could be executed.

According to another aspect is an apparatus for using a robust transmission protocol. The apparatus can include a signal evaluator and a signal generator. The signal evaluator can define robust transmission time period (RTTP) resources for at least one access point, the RTTP resources can identify a location of at least one RTTP slot. The signal generator can execute an orthogonalization protocol during one or more RTTP slots. The RTTP slots can be defined as potential candidates during which the orthogonalization protocol could be executed.

Another aspect relates to a processor for using a robust transmission protocol. The processor can comprise a means for defining robust transmission time period (RTTP) resources and a means for executing an orthogonalization protocol. The RTTP resources can identify a location of at least one RTTP slot. The orthogonalization protocol can be executed during one or more RTTP slots. The RTTP slots can be defined as potential candidates during which the orthogonalization protocol could be executed.

Another aspect relates to a computer program product for using a robust transmission protocol that comprises a computer-readable medium that includes codes executable by at least one computer. The computer codes can cause a computer to define robust transmission time period (RTTP) resources for at least one access point and execute an orthogonalization protocol during one or more RTTP slots. The RTTP resources can identify a location of at least one RTTP slot. The RTTP slots can be defined as potential candidates during which the orthogonalization protocol could be executed.

According to another aspect is a method for using a robust transmission protocol in a wireless communication environment. The method comprises receiving a robust transmission protocol and executing the robust transmission protocol during one or more robust transmission time period (RTTP) slots. The RTTP slots can be defined by the robust transmission protocol as potential candidates during which the orthogonalization protocol could be executed. The method can further include receiving a signal comprising a reverse link interference indicator therein and activating the one or more RTTP slots for use associated with a reverse link transmission based on the reverse link interference indicator.

Another aspect relates to an apparatus for using a robust transmission protocol in a wireless communication environment. The apparatus comprises a means for receiving a robust transmission protocol and a means for executing the robust transmission protocol during one or more robust transmission time period (RTTP) slots. The RTTP slots can be defined by the robust transmission protocol as potential candidates during which the orthogonalization protocol could be executed.

A further aspect relates to an apparatus for using a robust transmission protocol in a wireless communication environment. The apparatus comprises a receiver and a signal generator. The receiver can receive a robust transmission protocol. The signal generator can execute the orthogonalization protocol during one or more robust transmission time period (RTTP) slots defined by the robust transmission protocol as potential candidates during which the orthogonalization protocol could be executed.

Another aspect relates to a processor for using a robust transmission protocol in a wireless communication environment. The processor can comprise a means for receiving a robust transmission protocol and a means for executing the robust transmission protocol during one or more robust transmission time period (RTTP) slots. The RTTP slots can be defined by the robust transmission protocol as potential candidates during which the orthogonalization protocol could be executed.

A further aspect relates to a computer program product for using a robust transmission protocol in a wireless communication environment, comprises a computer-readable medium comprising codes executable by at least one computer. The codes can cause a computer to receive a robust transmission protocol and execute the robust transmission protocol during one or more robust transmission time period (RTTP) slots. The RTTP slots can be defined by the robust transmission protocol as potential candidates during which the orthogonalization protocol could be executed.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
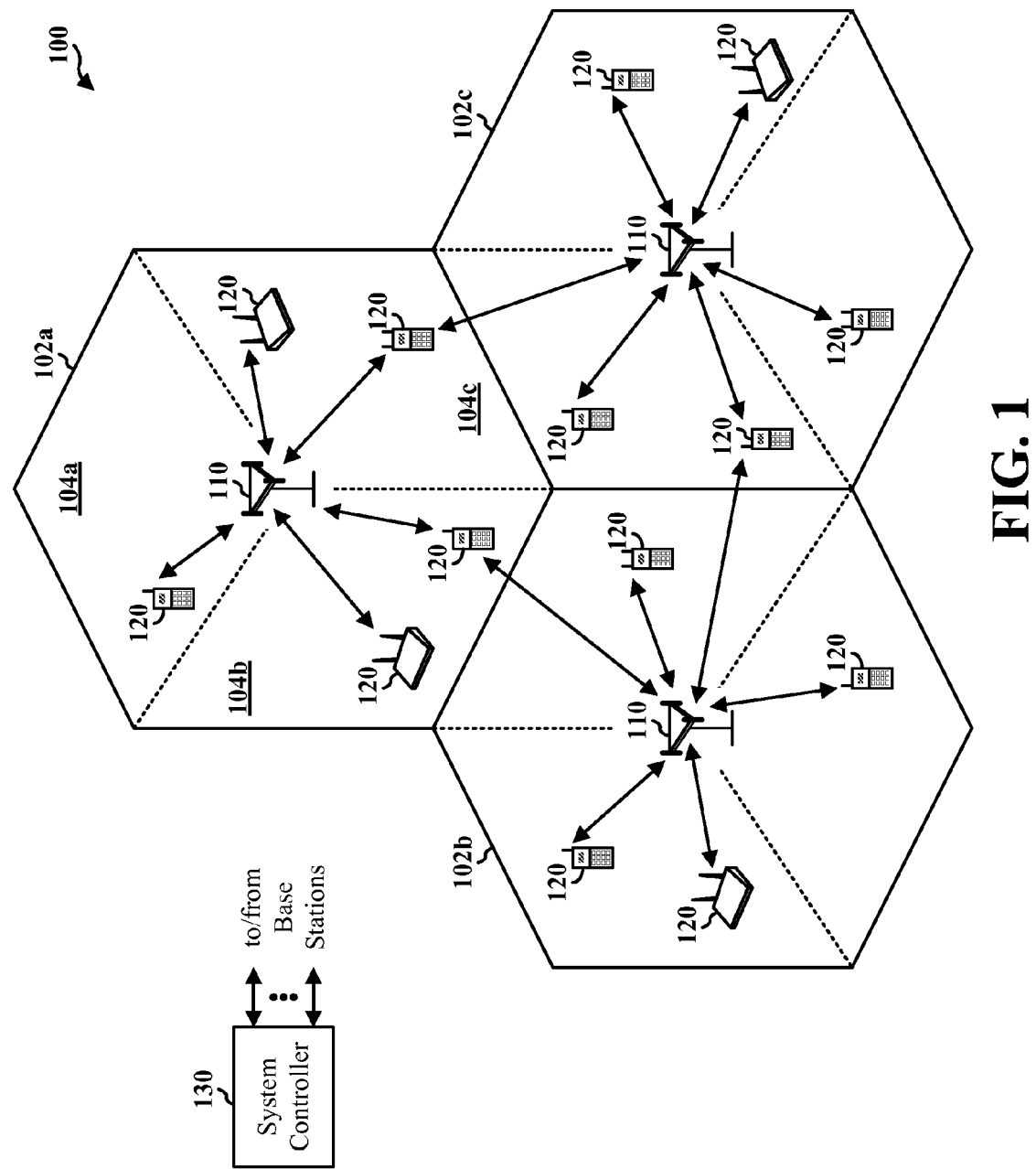
FIG. 1 illustrates a wireless communication system with multiple base stations and multiple terminals, such as may be utilized in conjunction with one or more aspects.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment that provides scalable resource reuse. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any aspect or design described herein as "exemplary" is not necessarily to be construed as preferred or advantageous over other aspects or designs.

FIG. 1 illustrates a wireless communication system 100 with multiple base stations 110 and multiple terminals 120, such as may be utilized in conjunction with one or more aspects. A base station is generally a fixed station that communicates with the terminals and may also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area may be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 2:
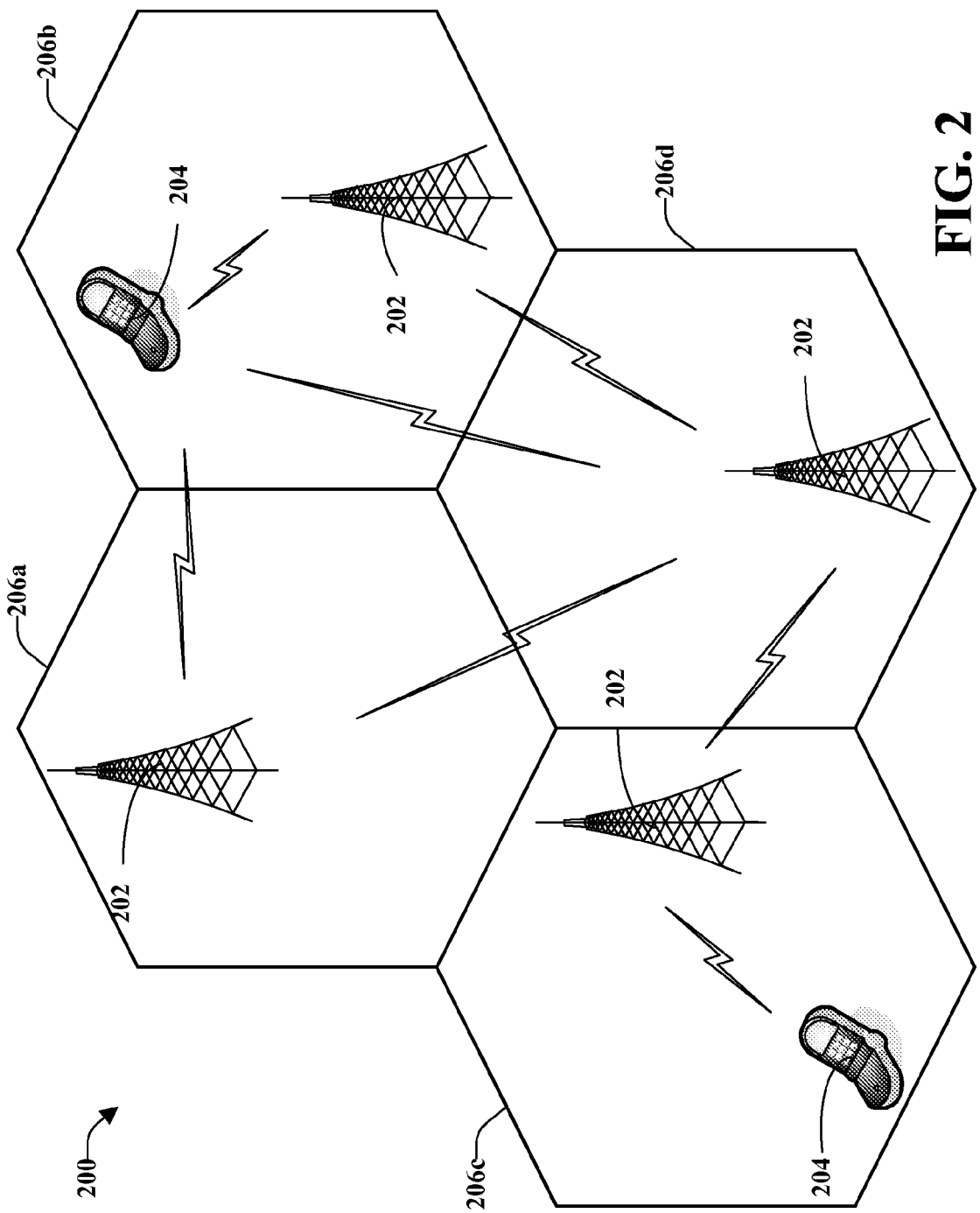
FIG. 2 is an illustration of an ad hoc or unplanned/semi-planned, wireless communication environment, in accordance with various aspects.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as three geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 may be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate providing scalable resource reuse in a wireless communication environment, as set forth with regard to subsequent figures.

Referring to FIGS. 3-6, methodologies relating to providing scalable resource reuse are illustrated. For example, methodologies can relate to providing scalable resource reuse in an FDMA environment, an OFDMA environment, a CDMA environment, a WCDMA environment, a TDMA environment, a SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 3:
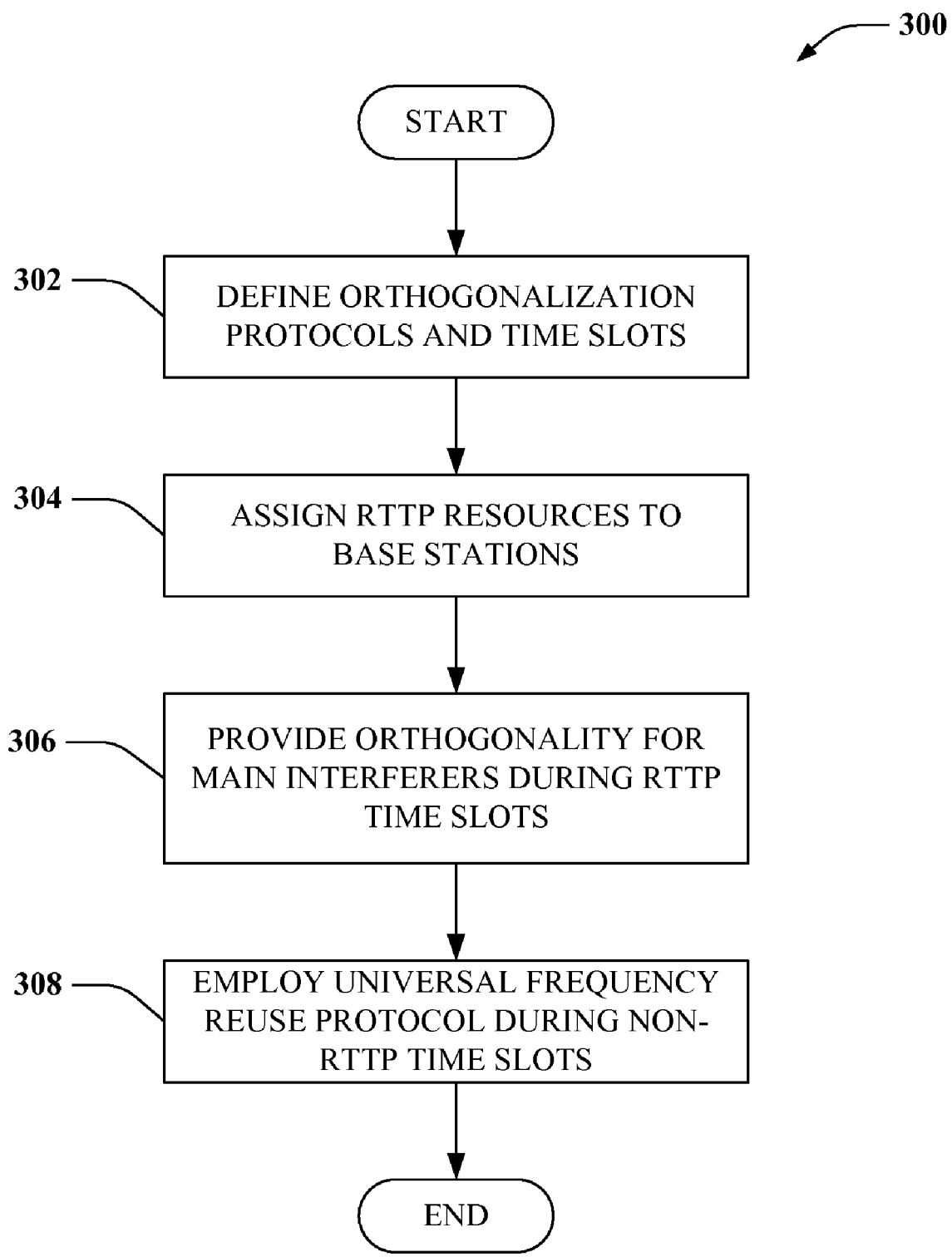
FIG. 3 is an illustration of a methodology for introducing scalable resource reuse as needed to trade off between system capacity and interference robustness, in accordance with one or more aspects.

FIG. 3 is an illustration of a methodology 300 for introducing scalable resource reuse as needed to trade off between system capacity and interference robustness, in accordance with one or more aspects. Method 300 can facilitate identifying interfering transmissions and pre-defining a manner and time in which interfering transmissions may orthogonalize (e.g., fully or partially) in order to mitigate interference. In this manner, resource reuse may be scaled to interference conditions, and reuse slots may be applied to services and/or transmissions that require robustness without affecting transmission efficiency in other time slots. By increasing interference robustness, method 300 may permit CDMA and other wireless technologies that allow the same frequency to be used in every cell. For example, this method may allow technologies such as EVDO to be deployed in an ad hoc or unplanned/semi-planned manner.

According to method 300, at 302, quasi-orthogonalization protocols (e.g., protocols by which interfering transmissions may be made partially or completely orthogonal to each other to mitigate interference) may be defined, as well as robust transmission time period (RTTP) slots during which orthogonalization may occur. The RTTP slots can be defined by a robust transmission protocol as potential candidates during which the orthogonalization protocol could be executed. In accordance with some aspects, defining the RTTP resources can be performed offline. At 304, RTTP resources (e.g., frequencies, subcarriers, ... ) may be assigned to the transmitter (e.g., access points, access terminals, base stations or the like) in the interfering region. The RTTP resources may be a subset of resources used during other time slots. At 306, orthogonality may be provided for transmissions from transmitters (e.g., in base stations, user devices, ... ) identified as main interferers in the interfering region during an RTTP time slot. The RTTP time slot can be a potential candidate during which the orthogonalization protocol could be executed. Additionally, during non-RTTP time slots, a universal frequency reuse technique can be employed, as illustrated at 308.

According to an example in which there are three frequencies available to sectors, two base stations may interfere with each other at an unacceptable level. If complete orthogonality is desired, then in RTTP slots, a first base station may utilize frequencies 1 and 3, while a second base station may utilize frequency 2. In the event that partial orthogonality is desired, then the first base station may utilize frequencies 1 and 2, and the second base station may utilize frequencies 2 and 3, thereby reducing interference by overlapping on one frequency rather than on all three frequencies. Channel encoding methods, such as Turbo or LDPC coding, with proper interleaving, can take advantage of unequal SNR on different frequencies of a single encoded physical layer packet sent over the overlapping and non-overlapping frequencies. Alternatively, if channel state information is available at the transmitter for the individual frequencies, different encoded packets can be sent on the overlapping and non-overlapping frequencies to the same user.

With conventional ad hoc or unplanned/semi-planned deployment of universal reuse technology such as CDMA, there is a loss in performance when compared to a planned deployment. Method 300 facilitates ensuring a minimum performance level. Such a minimum performance level may be needed for guaranteeing coverage for control channels and low-rate, delay-sensitive services, such as voice services. Furthermore, with ad hoc deployment, there may be situations where an interference level and minimum carrier-to-interference ratio (C/I) is acceptable, and there may be other situations where it is not acceptable. The table of CDMA forward link (base station to mobile station) geometries below provides an example that contrasts the achievable forward link C/I statistics with planned and unplanned deployment with universal reuse.

TABLE 1

|  | Planned | Unplanned Random | Unplanned Random (Clustered) |
|---|---|---|---|
| Mean C/I | 5.1 dB | 2.6 dB | −0.6 dB |
| Median C/I | 3.0 dB | 0.7 dB | −1.8 dB |
| $10^{th}$ % ile C/I | −3.3 dB | −5.3 dB | −7 dB |

Note that the above are examples of results that may be obtained by maintaining a same density of access points (APs) or base stations per unit area but deploying them in alternative manners. "Planned" represents the standard hexagonal layout network topology typically used in cellular networks as illustrated in FIG. 1. "Unplanned random" or "ad hoc" represents the case of randomly dropping APs and mobile terminals over a geographical area, as illustrated in FIG. 2. The "clustered random" case differs from the pure random case in that APs are deployed in groups that are close together to simulate ad hoc deployment in crowded areas (e.g., malls, food courts, stadiums, airports, ... ). The sample results illustrate that with ad hoc deployment, the range of obtainable performance is vast. In some cases, one may be able to sustain simultaneous transmissions (e.g., universal frequency reuse) at interfering cells, while in other cases, the minimum rate may not be sustainable by a large fraction of users, thus resulting in service outage if all transmitters used all the frequencies at all times. One technique to handle interference is static frequency reuse, commonly employed in narrow-band technologies like GSM. Accordingly, method 300 provides a flexible interference avoidance and reuse strategy to facilitate taking advantage of the benefits of the ad hoc deployment. Method 300 allows for partial overlap or full orthogonal selection of frequencies for the RTTP slots. Furthermore, the periodicity of occurrence of the RTTP slots depends on the deployment, so the degree of reuse is flexible. Finally, the RTTP slot can be dynamically used and/or independent of mobile station feedback.

According to another aspect, RTTP time slot protocols may be followed when needed and not otherwise. One way to determine whether the RTTP time slots are to be followed is to evaluate channel quality feedback from a receiver that it caused interference to. The feedback can be any feedback that describes a link quality. An example of such feedback that represents forward link quality is the Dynamic Rate Control (DRC) or equivalently, the Channel Quality Information (CQI) field, periodically reported by access terminals (ATs) to APs. It should be noted that some systems, such as EVDO use DRC while other systems, such as WCDMA or HSDPA use CQI. Assuming that the transmission of such feedback is decodable by all APs within the set of dominant interferers, the RTTP may be activated or de-activated, based on the set of decoded DRCs or CQIs heard from ATs that are not served by this AP. If the APs within the interfering set decode a DRC or CQI (or other feedback) value that is below a predetermined threshold value, then they all may assume that the RTTP time slots are active and may obey the RTTP protocols. If all decoded DRCs, CQIs, etc. are above the predetermined thresholds, the RTTP time slot need not be employed until it may become necessary, although it may be present in the transmission pattern (e.g., every third slot, every fifth slot, etc.). However, RTTP time slots used for transmission of broadcast control information nonetheless may always be followed if desired, thereby providing robustness for control information at the expense of some efficiency and dynamically trading off robustness and efficiency for data.

According to yet another aspect, receiver feedback may be utilized to explicitly request APs in an active set to abide by the RTTP time slot protocols, through the setting of a bit or the use of a special Walsh sequence cover for the feedback that described a link quality information. As a "safety net", the activation of RTTP may be confirmed via the backhaul, if the time scales of activation/de-activation are slow relative to backhaul delays. Additionally, the link quality (e.g., DRC, CQI) value may specify the degree of orthogonalization to be used during an RTTP slot. For example, one could use full orthogonalization for a very poor link quality, but allow some overlap if the link quality is better. As will be illustrated in FIG. 8, below, each may be permitted to randomly pick some number of carriers (e.g., two or more, or some other suitable number) as long as the link quality is above the threshold for full orthogonalization. Thus, there may be relatively poor C/I on carriers where there is overlap and relatively good C/I on orthogonal carriers. Even with the use of RTTP time slots, there may be some interference due to lack of perfect synchronization. Partial high interference during a packet transmission, however, could be taken care of by appropriate back-off in rate selection and through hybrid ARQ. Specifically, if the predicted SNR is 10 dB when all interferers were perfectly synchronized during the RTTP slot, then the rate selection could use a back-off of 3 dB and select a rate that corresponds to 7 dB. This would allow a 3 dB margin for interference that may happen over part of the packet transmission due to imperfect synchronization. Hybrid ARQ is another well-known technique used to ensure that previously erroneous transmissions of a packet still provide useful information to the decoder.

Figure 4:
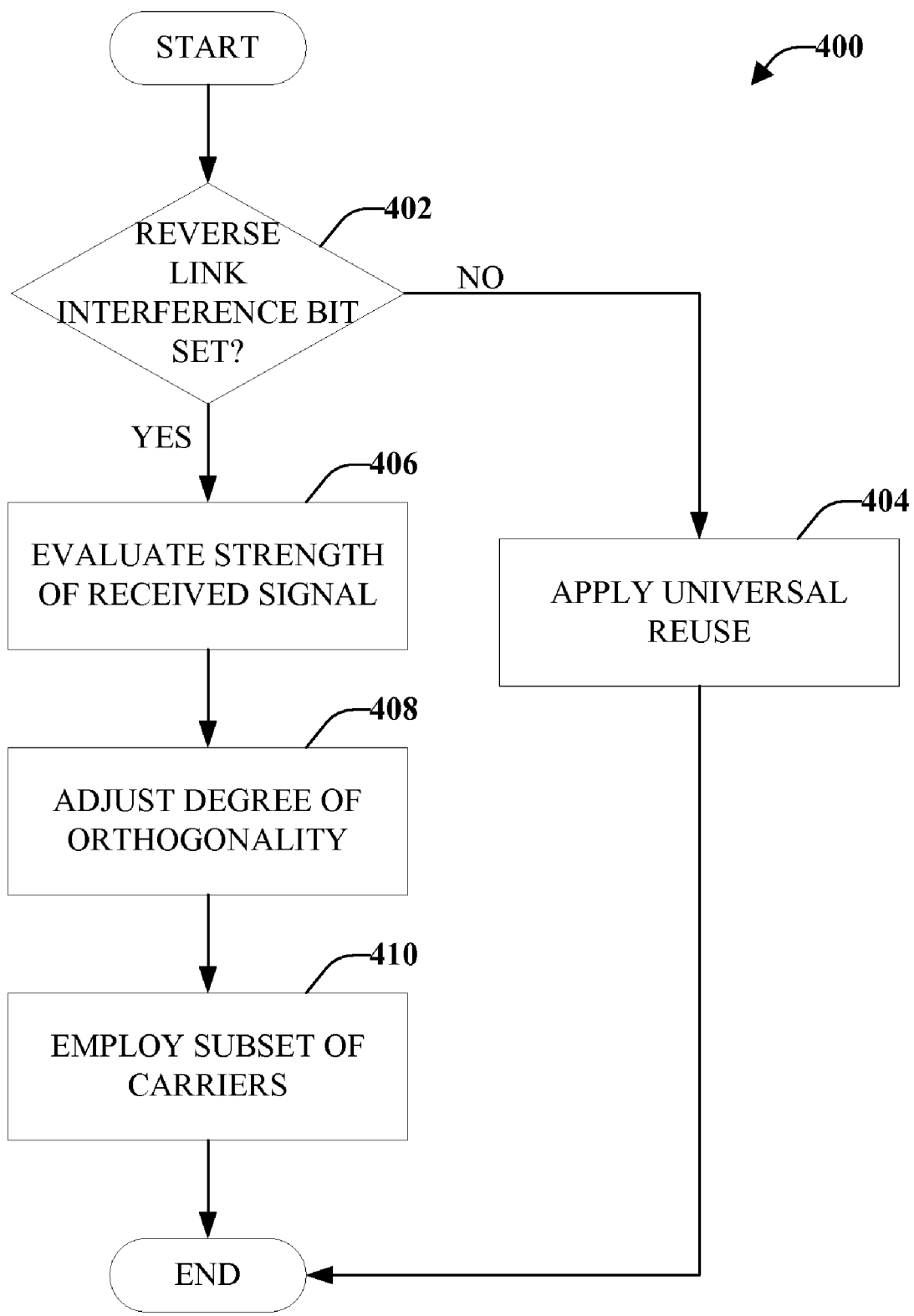
FIG. 4 is an illustration of a method for mitigating interference in a wireless communication environment, in accordance with one or more aspects.

FIG. 4 is an illustration of a method 400 for mitigating interference in a wireless communication environment, in accordance with various aspects. The mechanism of robust transmissions described herein may be applied to the reverse link in an additional manner. The reverse link, from ATs to AP, is a "many-to-one" link. That is, many terminals may simultaneously transmit to a single AP or base station. In some commercially-deployed CDMA systems, many ATs may simultaneously transmit to their AP without being scheduled explicitly. According to various aspects, RTTP time slots on the reverse link permit certain users (e.g., those that are at the edge of the cell) to transmit over a subset of carriers during RTTP time periods to reduce the interference they cause to neighbor cells. In systems such as EVDO, reverse-link interference is controlled by the base station that broadcasts a reverse link interference indicator, such as a reverse activity bit (RAB).

According to the method, at 402, a determination may be made regarding whether a reverse link interference indicator (e.g., RAB bit) is set on a received signal. This indicator may be set by at least one non-serving AP. If the interference indicator is not set ("NO"), method continues, at 404, where universal reuse is applied. If the interference indicator is set ("YES"), an AP is requesting a reduction in interference. ATs within a cell served by the AP, as well as ATs in a neighbor cell that can hear the reverse link interference indicator from the AP, may take appropriate action to reduce the interference. Typically, an AT that receives a signal comprising a set interference indicator would reduce its overall transmit power. The reverse link interference indicator mechanism may additionally be employed to trigger the utilization of RTTP time slots in the reverse link. Either the setting of the reverse link interference indicator can be used to activate the RTTP slots, or a different broadcast message may be used to trigger the activation. ATs that hear a neighboring base station's reverse link interference indicator may activate the RTTP slot, while ATs that do not hear the R reverse link interference indicator signal may not activate the RTTP slot.

At 406, a strength of the received signal that includes the interference indicator may be evaluated. Depending on the strength at which the neighbor cell's interference indicator is detected, a degree of orthogonalization may be adjusted, at 408. The AT may indicate the carriers it is using through in-band signaling. According to a related aspect, the AP may indicate the degree of orthogonalization it desires on the broadcast message itself. At 410, a subset of carriers are employed per the degree of orthogonality determined.

Figure 5:
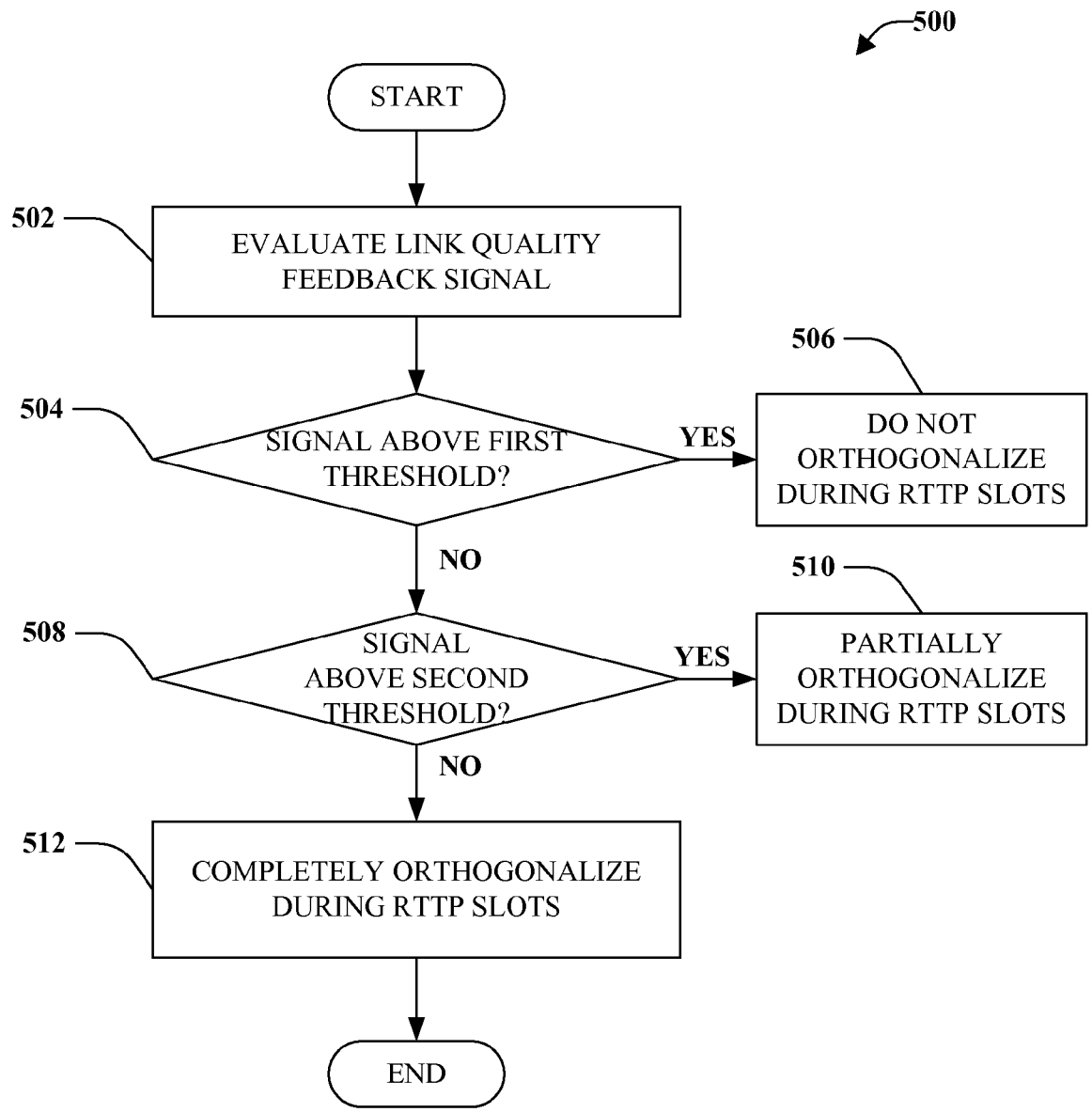
FIG. 5 is an illustration of a method that facilitates performing a scalable orthogonalization protocol for transmissions during RTTP slots, in accordance with one or more aspects.

FIG. 5 is an illustration of a method 500 that facilitates performing a scalable orthogonalization protocol for transmissions during RTTP slots, in accordance with one or more aspects. At 502, feedback signals that describe a link quality (e.g., DRC, CQI) may be evaluated to determine a data rate for one or more transmissions during RTTP slots. At 504, the feedback signals may be compared to a first predetermined threshold data rate. If the lowest feedback signal for a given communication is above the first predetermined threshold, then at 506 a determination may be made not to orthogonalize signals during RTTP time slots. If the lowest feedback signal is not above the first predetermined threshold, then a comparison may be made, at 508, to determine whether the lowest feedback signal is above a second predetermined threshold. The second predetermined threshold may be lower than the first predetermined threshold. If the feedback signal is above the second predetermined threshold (and below the first predetermined threshold as determined at 504), then at 510 a partial orthogonalization protocol may be performed on signals transmitted during RTTP slots. If the comparison at 508 indicates that the lowest feedback signal is not above the second predetermined threshold, then at 512, a full-orthogonalization may be performed on RTTP slot transmissions. It will be appreciated that any number of graduations may be implemented in accordance with performing a partial or quasi-orthogonalization technique. For instance, the method need not be limited to first and second predetermined thresholds, but rather any number of predetermined thresholds may be implemented and may correspond to respective levels of orthogonalization ranging from complete orthogonalization to no orthogonalization.

Figure 6:
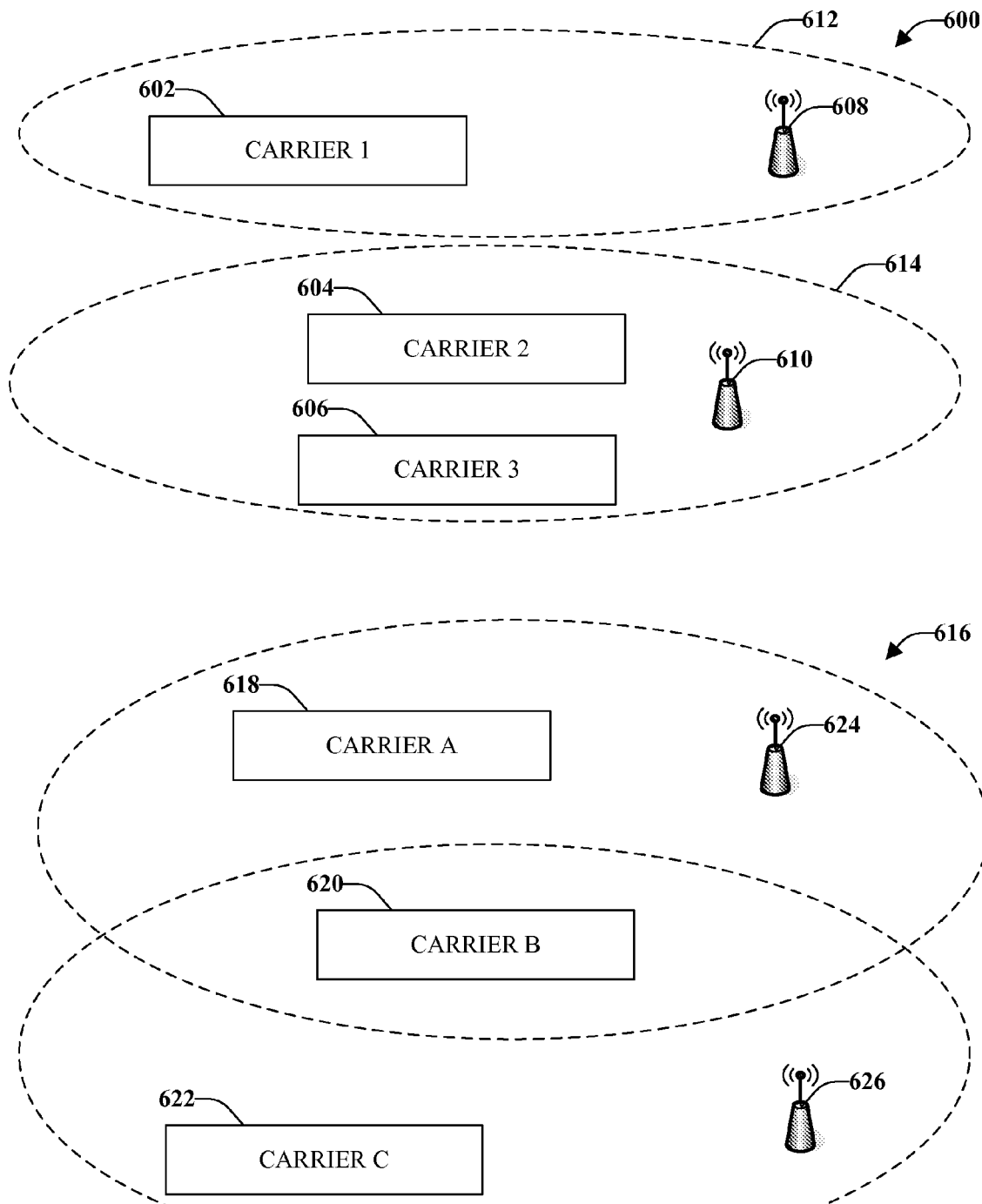
FIG. 6 is a schematic illustration of different orthogonalization schemes in accordance with the disclosed aspects.

FIG. 6 is a schematic illustration of different orthogonalization schemes in accordance with the disclosed aspects. It should be understood that there could be more or fewer carrier and/or base stations than those illustrated and described with reference to this figure.

A full orthogonalization scheme is illustrated at 600 having three carriers, Carrier 1 (602), Carrier 2 (604) and Carrier 3 (606) and two APs, AP1 (608) and AP2 (610). AP1 (608) might use Carrier 1 (602), illustrated by dotted line 612 and AP2 (610) might use Carrier 2 (604) and Carrier 3 (606), illustrated by dotted line 614. In this full orthogonalization scheme, AP1 (608) and AP2 (610) do not interfere since completely different carriers are utilized.

At 616, a partial orthogonalization scheme is illustrated. There are three carriers, Carrier A (618), Carrier B (620) and Carrier C (622) and two APs: AP1 (624) and AP2 (626). As illustrated Carrier A (618) and Carrier B (620) belong to AP1 (624) and Carrier B (620) and Carrier C (622) belong to AP2 (626). In this case, the APs 624 and 626 do not interfere on Carrier A (618) and Carrier C (622) but they do interfere on Carrier B (620).

Another scheme (not illustrated) can be referred to as a soft gradation scheme. For example, on Carrier 1, AP1 is allowed to transmit at full power. On Carrier 2, AP1 transmits at half power and AP2 transmits at half power. On Carrier 3, AP1 transmits at very low power and AP2 transmits at high power. It should be understood that other power schemes or power reduction amounts can be utilized. Thus, partial orthogonalization can include reducing a power associated with at least a subset of carriers.

Figure 7:
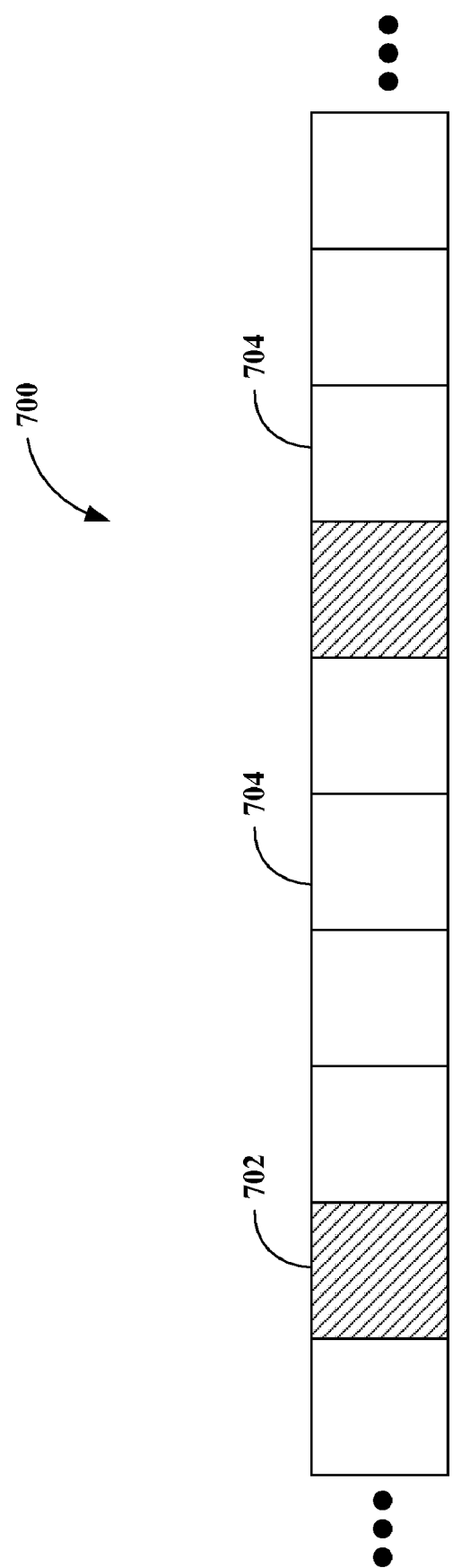
FIG. 7 illustrates an RTTP time slot pattern that may be utilized in conjunction with one or more aspects presented herein.

FIG. 7 illustrates an RTTP time slot pattern 700 that may be utilized in conjunction with one or more aspects presented herein. According the figure, an RTTP time slot 702 is provided every fifth time slot during a transmission, as well as a plurality of non-RTTP time slots 704. RTTP transmission protocols can be employed to assign predefined ways in which interfering transmissions may fully or partially orthogonalize their transmissions, and pre-defined time periods, such as RTTP slots 702, when interfering transmissions may adhere to the predefined orthogonalization protocols. During non-RTTP time slots, transmissions may be performed without any restrictions. For purpose of illustration, consider a multi-carrier EVDO system, wherein all base stations are synchronized. An RTTP time slot 702 may be defined within a longer time period 700, and the base stations within an interfering region may know the location and periodicity of such RTTP slot 702. Furthermore, each base station may be assigned a subset of resources that they may utilize for the RTTP slot 702. It will be appreciated that while the length of some RTTP slots 702 may be substantially similar to non-RTTP slot 704 length, other RTTP slots 702 may be longer or shorter than non-RTTP slots 704, depending on design parameters, interference requirements, and the like. According to another aspect, RTTP slots may have a uniform length relative to each other, which may be longer than, shorter than, or substantially similar to non-RTTP slots.

Figure 8:
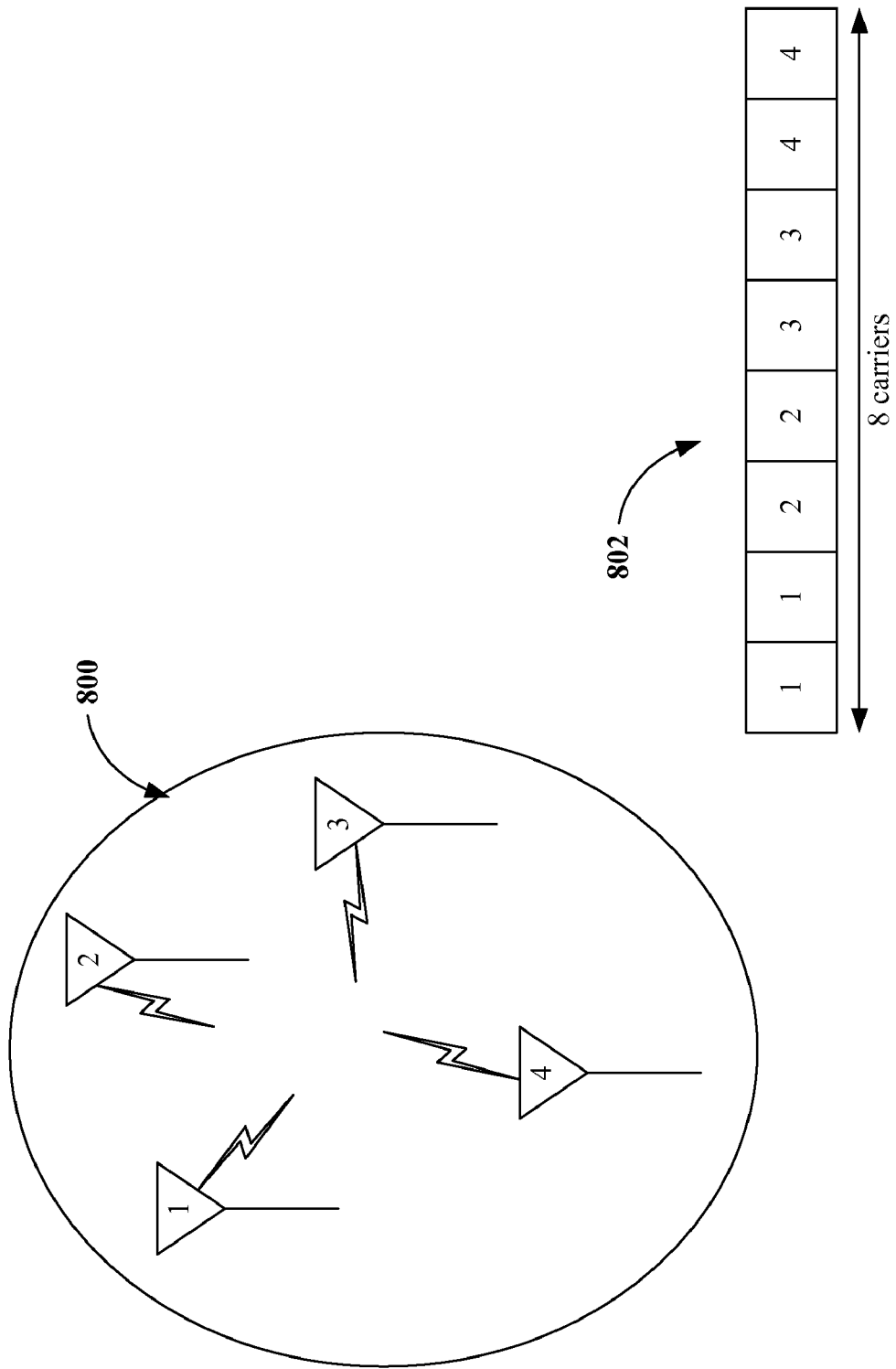
FIG. 8 is an illustration of four access points within an interfering region and carrier assignments for each access point to use during an RTTP slot, in accordance with one or more aspects.

FIG. 8 is an illustration of four APs within an interfering region 800 and carrier assignments 802 for each AP to use during an RTTP slot, in accordance with one or more aspects. During non-RTTP slots, each AP may be permitted to use all 8 carriers. Thus, during RTTP slots, complete orthogonality to the main interferers may be obtained, while in other slots (e.g., non-RTTP slots) universal frequency reuse may be optimized. As will be understood by those skilled in the art, the processes associated with determining which base stations are within an interfering set and how they are informed of the RTTP can be performed, for instance, when the network topology changes, and may utilize feedback from receivers in a region of a wireless communication environment. Thus, RTTP time slots may be used for any transmissions that may benefit from increased robustness. For example, control channel transmission that needs to reach the edge of a cell, low-rate delay-sensitive transmissions to a receiver, transmissions that are close to reaching their HARQ retransmission limit, and the like are types of transmissions that may benefit from the various aspects described herein.

Figure 9:
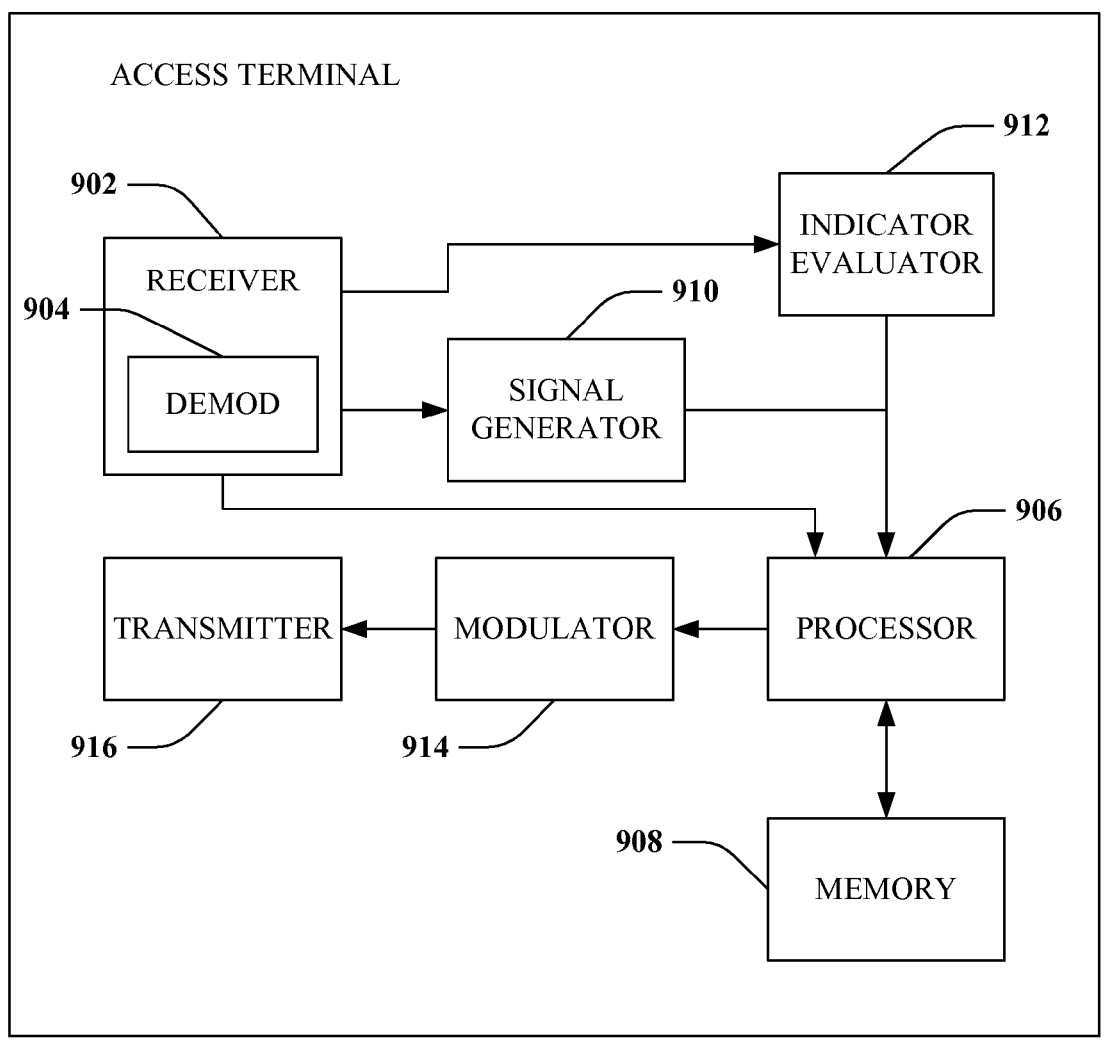
FIG. 9 is an illustration of an access terminal that facilitates providing a predefined protocol for fully or partially orthogonalizing interfering transmissions, in accordance with one or more aspects.

FIG. 9 is an illustration of an access terminal 900 that facilitates providing a predefined protocol for fully or partially orthogonalizing interfering transmissions, in accordance with one or more aspects. Access terminal 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. The received signal can include a reverse link interference indicator thereon. Receiver 902 can also receive an orthogonalization protocol (e.g., full, partial). Receiver 902 can comprise a demodulator 904 that can demodulate received symbols and provide them to a processor 906 for channel estimation. Processor 906 can be a processor dedicated to analyzing information received by receiver 902 and/or generating information for transmission by a transmitter 916, a processor that controls one or more components of access terminal 900, and/or a processor that both analyzes information received by receiver 902, generates information for transmission by transmitter 916, and controls one or more components of access terminal 900. Additionally, processor 906 may execute instructions for evaluating performing a resource reuse protocol during non-RTTP slots, for performing a partial or complete orthogonalization protocol during RTTP slots, for determining a level of orthogonalization (e.g., complete, partial, none, etc.)

Access terminal 900 can additionally comprise memory 908 that is operatively coupled to processor 906 and that may store data to be transmitted, received data, and the like. Memory 908 may store information related to link quality values (e.g., DRC, CQI), reverse link interference indicator values (e.g., RAB) values and/or signal strength, protocols for evaluating the foregoing, protocols for comparing evaluated values to predetermined threshold values in order to facilitate determining an appropriate action (e.g., complete or partial orthogonalization), etc.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Receiver 902 is further operatively coupled to signal generator 910, which may generate DRC, CQI or other information for transmission to an access point, which may then compare the received value(s) to a number of predetermined thresholds to determine a level of orthogonalization to apply to subsequent forward link transmissions to reduce interference, as described above. Signal generator 910 can be configured to execute a robust transmission protocol during one or more RTTP slots. These RTTP slots can be defined by the robust transmission protocol as potential candidates during which the orthogonalization protocol could be executed. Additionally, signal generator 910 can activate one or more RTTP slots for use associated with a reverse link transmission based on a reverse link interference indicator.

An indicator evaluator 912 may evaluate and/or monitor a received signal to determine whether an reverse link interference indicator (e.g., RAB) is set, whether the signal is decodable, etc., in order to facilitate determining whether to employ a designated subset of available carriers for a subsequent transmission or whether to relinquish control there over, as described above. Indicator evaluator 912 may determine whether the reverse link interference indicator is set in a received signal and the signal generator 910, based on the determination, may activate one or more RTTP slots for transmission on a reverse link. The indicator evaluator 912 may further evaluate a signal strength at which the reverse link interference indicator is received and the signal generator 910, can use the evaluated signal strength to determine activation of RTTP. The signal generator 910 can adjust a level of orthogonality for a reverse link transmission as a function of the signal strength of the reverse link interference indicator. Additionally, the signal generator 910 may continue to employ the designated subset of carriers for the reverse link transmission if the reverse link interference indicator is set by at least one AP that is not serving this access terminal 900. When the indicator evaluator 912 determines that a reverse link interference indicator is no longer set, such as through monitoring of the received signal, the signal generator 910 can deactivate the use of RTTP resources on all carriers in an unrestricted manner.

Access terminal 900 still further comprises a modulator 914 and a transmitter 916 that transmits the signal to, for instance, a base station, an access point, another access terminal, a remote agent, etc. Although depicted as being separate from the processor 906, it is to be appreciated that signal generator 910 and indicator evaluator 912 may be part of processor 906 or a number of processors (not shown).

Figure 10:
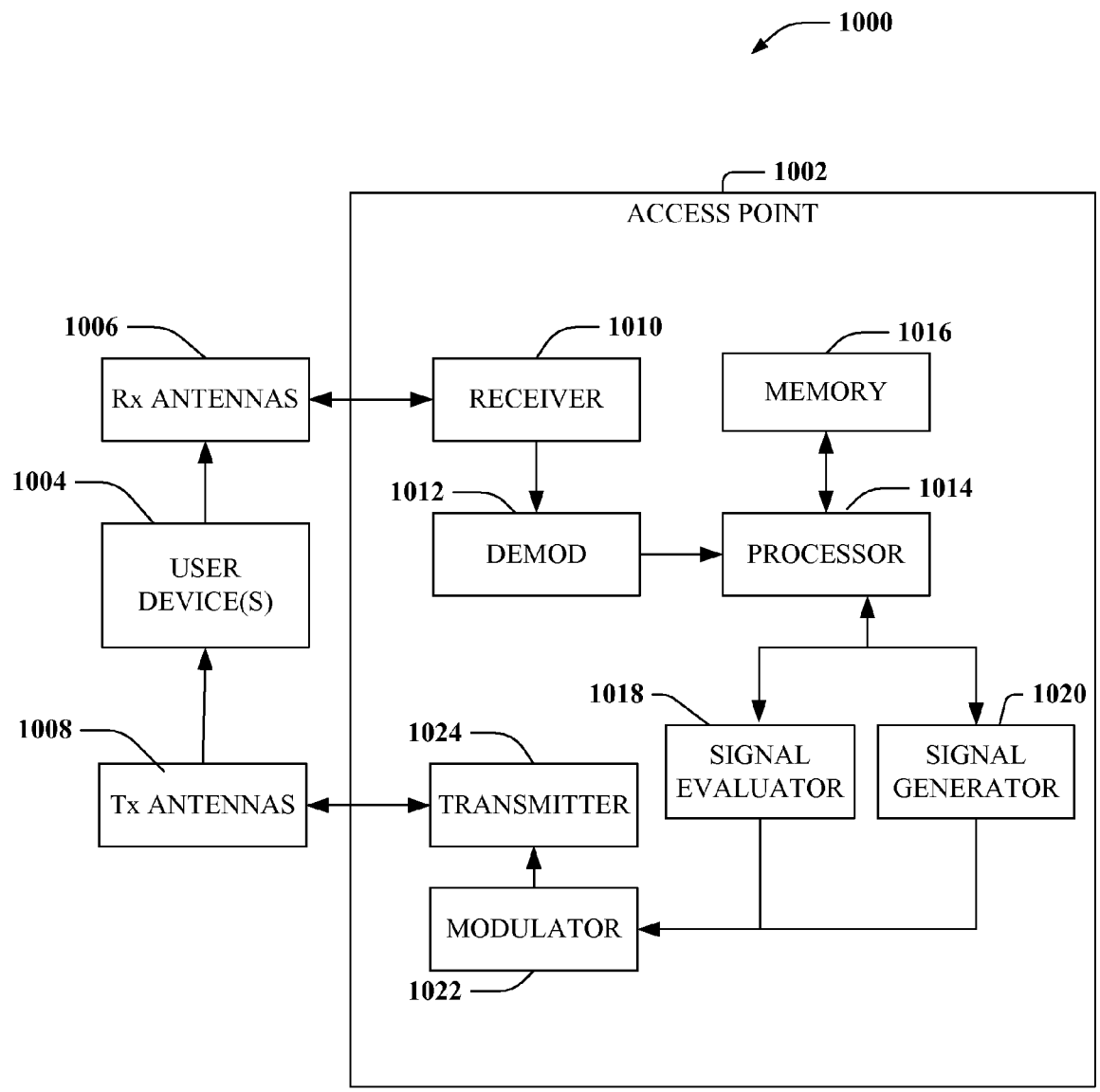
FIG. 10 is an illustration of a system that facilitates permitting partial orthogonalization of transmissions when interference is high and resource reuse at other times, in accordance with one or more aspects.

FIG. 10 is an illustration of a system 1000 that facilitates permitting partial orthogonalization of transmissions when interference is high and resource reuse at other times, in accordance with one or more aspects. System 1000 comprises an access point 1002 with a receiver 1010 that receives signal (s) from one or more user devices 1004 through a plurality of receive antennas 1006, and a transmitter 1024 that transmits to the one or more user devices 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores information related to resource reuse, resource assignments, RTTP slots, orthogonalization protocols, and/or any other suitable information related to performing the various actions and functions set forth herein.

Processor 1014 may be further coupled to signal evaluator 1018 and a signal generator 1020, which may evaluate and generate respective signals for access point 1002. Signal evaluator 1018 may compare a received signal (e.g., DRC signal) to a plurality of thresholds to determine whether to completely or partially orthogonalize subsequent transmissions to mitigate interference. Signal evaluator 1018 define RTTP resources, such as by determining how often control data is to be sent and/or based on interference data. In accordance with some aspects, the RTTP resources are defined offline. The RTTP resources can identify a location of at least one RTTP slot. In addition, the RTTP resources can include a set of one or more carriers to be executed during the one or more RTTP slots. For example, a partial orthogonalization protocol may be executed during one or more RTTP slots if a forward link quality information value is below a first predetermined threshold and higher than a second predetermined threshold. Partial orthogonalization may include reducing a power associated with at least one carrier. A complete orthogonalization protocol may be executing during one or more RTTP slots when information indicates that a forward link quality value is below the second predetermine threshold. Signal evaluator 1018 may execute a universal frequency reuse during non-RTTP slots. A universal frequency reuse protocol may be executed during one or more RTTP slots if information about a forward link quality value is not decoded or is decoded but has a value below a first predetermined threshold.

Signal generator 1020 may generate and/or set a reverse link interference indicator (e.g., reverse activity bit) in a forward link signal to permit an access terminal to evaluate the interference indicator in order to determine whether to employ a pre-designated set of carriers for transmission on a reverse link during RTTP slots. Signal generator 1020 may identify interfering transmissions and then assign RTTP resources to base stations in an interfering region and signal evaluator 1018 may execute an orthogonalization protocol during one or more RTTP slots to provide orthogonalization. The RTTP slots can be specified for use during which the orthogonalization protocol may be executed. For example, if additional robustness is desired, a fraction or ratio of RTTP slots to non-RTTP can be changed or modified. A slot size can be adaptively changed and once a slot size is defined, the slot size for both RTTP and non-RTTP slots are the same.

Signal evaluator 1018 may evaluate a channel quality feedback signal from a receiver that it causes interference to. Signal generator 1020 can increase RTTP slot duration and/or increase the fraction of RTTP slots as perceived interference increases. A multitude of RTTP slots can be inserted into a transmission schedule at defined intervals, which can be regular or random intervals. As interference increases, the interval between RTTP slots may be decreased.

Processor 1014 may execute instructions for assigning resources to user devices 1004, for generating and/or defining RTTP slots, allocating RTTP resources, defining orthogonalization protocols, etc. Processor 1014 may be further coupled to a modulator 1022, which may multiplex assignment information for transmission by a transmitter 1024 through antenna 1008 to user device(s) 1004. Although depicted as being separate from processor 1014, it is to be appreciated that signal evaluator 1018, RAB generator 1020, and/or modulator 1022 may be part of processor 1014 or a number of processors (not shown).

Figure 11:
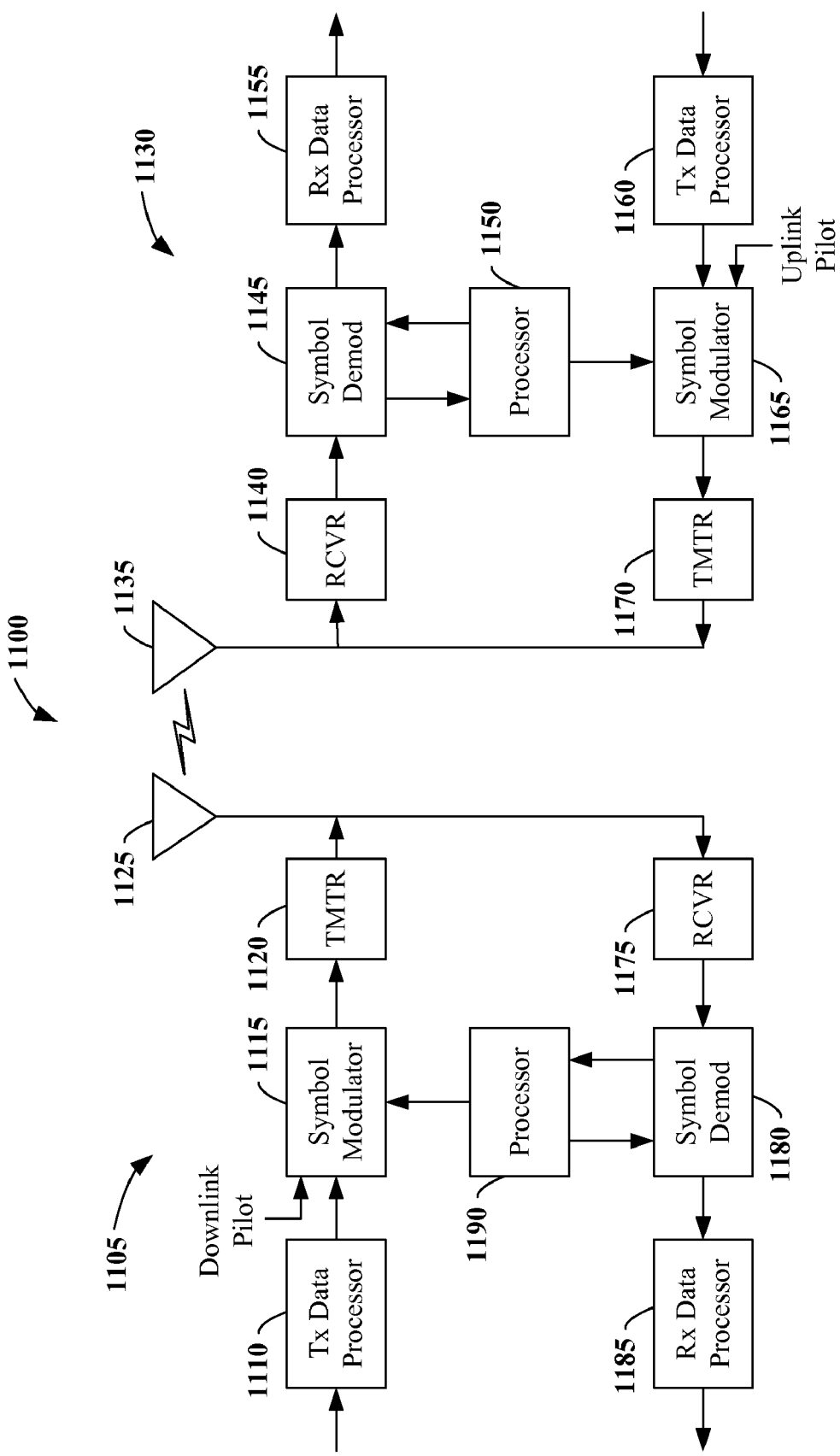
FIG. 11 is an illustration of a wireless network environment that can be employed in conjunction with the various systems and methods described herein.

FIG. 11 shows an exemplary wireless communication system 1100. The wireless communication system 1100 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1120 multiplexes data and pilot symbols and provides them to a transmitter unit (TMTR) 1120. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink. Multiple terminals may transmit pilot concurrently on the uplink on their respective assigned sets of pilot subbands, where the pilot subband sets may be interlaced.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
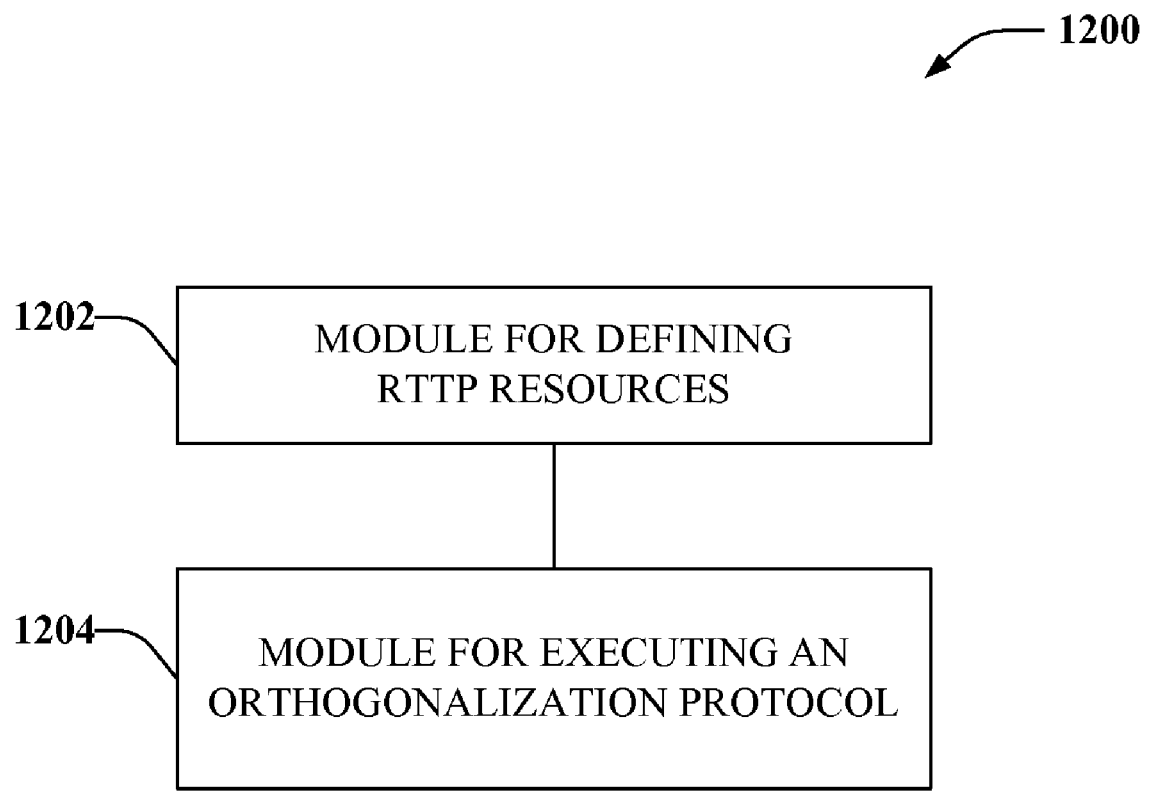
FIG. 12 is an illustration of an apparatus that facilitates using a robust transmission protocol to trade off between system capacity and interference robustness, in accordance with one or more aspects.

FIG. 12 is an illustration of an apparatus 1200 that facilitates using a robust transmission protocol to trade off between system capacity and interference robustness on a forward link, in accordance with one or more aspects. Apparatus 1200 is represented as a series of interrelated functional blocks, which can represent functions implemented by a processor, software, or combination thereof (e.g., firmware). For example, apparatus 1200 may provide modules for performing various acts, such as are described above. Apparatus 1200 can facilitate identifying interfering transmissions and predefining a manner and time in which interfering transmissions may orthogonalize (e.g., fully or partially) in order to mitigate interference. In this manner, resource reuse may be scaled to interference conditions, and reuse slots may be applied to services and/or transmissions that require robustness without effecting transmission efficiency in other time slots. By increasing interference robustness, apparatus 1200 may permit cellular technologies, such as "EVDO-like" technologies, to be deployed in an ad hoc or unplanned/semi-planned manner.

Apparatus 1200 comprises a module for defining RTTP resources (e.g., frequencies, subcarriers, . . . ) 1202 that may allocate RTTP resources to base stations (e.g., access points or the like) in an interfering region. The RTTP resources may be a subset of resources used during other time slots and can identify a location of at least one RTTP slot. The RTTP resources can include a set of at least one carrier to be executed during at least one of the RTTP slots. A module for executing an orthogonalization protocol 1204 may be employed to orthogonalize transmissions from base stations identified as main interferers in the interfering region during an RTTP time slot. Module for executing an orthogonalization protocol 1204 may facilitate providing partial orthogonality or complete orthogonality between transmissions as described above. In this manner, apparatus 1200 facilitates providing a flexible interference avoidance and reuse strategy, such as that described above with regard to preceding figures, to facilitate taking advantage of the benefits of the ad hoc or unplanned/semi-planned deployment.

Figure 13:
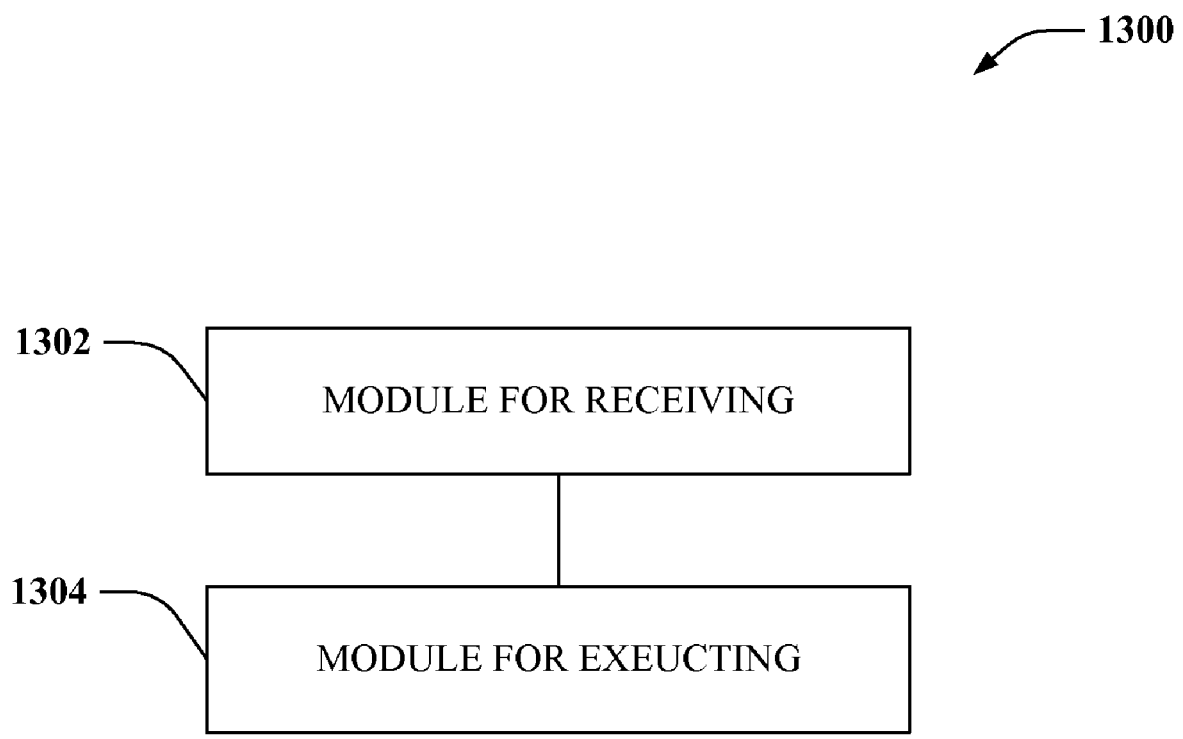
FIG. 13 illustrates an apparatus that facilitates using a robust transmission protocol to trade off between system capacity and interference robustness on a reverse link, in accordance with one or more aspects.

FIG. 13 illustrates an apparatus that facilitates using a robust transmission protocol to trade off between system capacity and interference robustness on a reverse link, in accordance with one or more aspects. Apparatus 1300 is represented as a series of interrelated functional blocks, which can represent functions implemented by a processor, software, or combination thereof (e.g., firmware). For example, apparatus 1300 may provide modules for performing various acts, such as are described above. Apparatus 1300 may comprise a module for receiving 1302 that receives an orthogonalization protocol. Apparatus 1300 can also include a module for executing 1304 the robust transmission protocol during one or more RTTP slots. The RTTP slots can be defined by the robust transmission protocol as potential candidates during which the orthogonalization protocol could be used Apparatus 1300 can further include a module a module for receiving a signal (nor shown) from, for instance, an access point and determines whether a reverse link interference indicator is set in the received signal. For example, the module for receiving a signal may detect the indicator and determine whether it is set and decodable. The determination of whether the indicator is decodable may comprise, for instance, evaluating received signal strength of the indicator and comparing the received signal strength to a predetermined threshold value. If the received signal strength is below the predetermined threshold value, then the indicator may not be decodable. Apparatus 1300 may further comprise a module for activation (not shown), which can activate one or more RTTP slots for transmission on a reverse link based on the whether the indicator is set or not set. In this manner, scalable resource reuse may be performed on a reverse link, in addition to a forward link as described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of using a robust transmission protocol in a wireless communication environment, comprising:
    defining robust transmission time period (RTTP) resources, said RTTP resources identifying a location of at least one RTTP slot of a plurality of RTTP slots in a transmission schedule, wherein the RTTP slots are defined as potential candidates during which an orthogonalization protocol could be executed;
    modifying a ratio of RTTP to non-RTTP slots in the transmission schedule based on a channel quality feedback signal; and
    executing the orthogonalization protocol pursuant to the transmission schedule, wherein the orthogonalization protocol provides orthogonalization between transmissions corresponding to different apparatuses during the at least one RTTP slot.

2. The method of claim 1, wherein the RTTP resources comprise a set of at least one carrier for executing the orthogonalization protocol during the at least one RTTP slot.

3. The method of claim 1, further comprising executing a universal frequency reuse protocol during non-RTTP slots.

4. The method of claim 1, wherein the orthogonalization protocol provides complete orthogonalization between the transmissions.

5. The method of claim 1, wherein the execution comprises randomly picking some of the RTTP resources for communication during the at least one RTTP slot.

6. The method of claim 1, wherein the orthogonal protocol provides partial orthogonalization between the transmissions.

7. The method of claim 6, wherein the partial orthogonalization is achieved by randomly picking some of the RTTP resources for communication during the at least one RTTP slot.

8. The method of claim 6, wherein the partial orthogonalization includes reducing a power associated with at least a subset of carriers.

9. The method of claim 1, wherein execution comprises:
    receiving a channel quality feedback signal; and
    evaluating the channel quality feedback signal.

10. The method of claim 9, wherein the channel quality feedback evaluation specifies a degree of orthogonalization to be used during the at least one RTTP slot.

11. The method of claim 10, wherein the degree of orthogonalization comprises partial orthogonalization.

12. The method of claim 9, further comprising executing a universal frequency reuse protocol during the at least one RTTP slot based on the channel quality feedback signal.

13. The method of claim 1, further comprising inserting at least one RTTP slot into a transmission schedule at defined intervals.

14. The method of claim 1, wherein the defining of the RTTP resources is performed offline.

15. The method of claim 1, wherein defining the RTTP resources comprises determining how often control data will be sent by at least one of the access points.

16. The method of claim 1, wherein defining the RTTP resources is based on interference data.

17. The method of claim 1, wherein the different apparatuses comprise different access points, wherein a different subset of a plurality of carriers is assigned to each of the access points during the at least one RTTP slot, and wherein the access points reuse the plurality of carriers during non-RTTP slots.

18. An apparatus for using a robust transmission protocol, comprising:
    means for defining robust transmission time period (RTTP) resources, said RTTP resources identifying a location of at least one RTTP slot of a plurality of RTTP slots in a transmission schedule, wherein the RTTP slots are defined as potential candidates during which an orthogonalization protocol could be executed;
    means for modifying a ratio of RTTP to non-RTTP slots in the transmission schedule based on a channel quality feedback signal; and
    means for executing the orthogonalization protocol pursuant to the transmission schedule, wherein the orthogonal protocol provides orthogonalization between transmissions corresponding to the apparatus and at least one other apparatus during the at least one RTTP slot.

19. An apparatus for using a robust transmission protocol comprising:
    a signal evaluator that defines robust transmission time period (RTTP) resources, said RTTP resources identifying a location of at least one RTTP slot of a plurality of RTTP slots in a transmission schedule, wherein the RTTP slots are defined as potential candidates during which an orthogonalization protocol could be executed; and
    a signal generator that executes the orthogonalization protocol pursuant to the transmission schedule, wherein the orthogonalization protocol provides orthogonalization between transmissions corresponding to the apparatus and at least one other apparatus during the at least one RTTP slot, wherein the signal generator further modifies a ratio of RTTP to non-RTTP slots in the transmission schedule based on a channel quality feedback signal.

20. The apparatus of claim 19, wherein the RTTP resources comprise a set of at least one carrier to be executed during the at least one RTTP slot.

21. The apparatus of claim 19, the signal evaluator further executes a universal frequency reuse protocol during non-RTTP slots.

22. The apparatus of claim 19, wherein the orthogonalization protocol provides complete orthogonalization between the transmissions.

23. The apparatus of claim 19, wherein the signal generator randomly picks some of the RTTP resources for communication during the at least one RTTP slot.

24. The apparatus of claim 19, wherein the orthogonalization protocol provides partial orthogonalization between the transmissions.

25. The apparatus of claim 24, wherein the partial orthogonalization is achieved by randomly picking some of the RTTP resources for communication during the at least one RTTP slot.

26. The apparatus of claim 24, wherein the partial orthogonalization includes reducing a power associated with at least a subset of carriers.

27. The apparatus of claim 19, further comprising a receiver that receives channel quality feedback signal that is evaluated by the signal evaluator.

28. The apparatus of claim 27, wherein the channel quality feedback evaluation specifies a degree of orthogonalization to be used during the at least one RTTP slot.

29. The apparatus of claim 28, wherein the degree of orthogonalization comprises partial orthogonalization.

30. The apparatus of claim 27, the signal evaluator executes a universal frequency reuse protocol during the at least one RTTP slot based on the channel quality feedback signal.

31. The apparatus of claim 19, the signal generator further inserts at least one RTTP slot into a transmission schedule at defined intervals.

32. The apparatus of claim 19, wherein the RTTP resources are defined offline.

33. The apparatus of claim 19, to define the RTTP resources the signal evaluator determines how often control data will be sent by the apparatus.

34. The apparatus of claim 19, the signal evaluator defines the RTTP resources based on interference data.

35. A non-transitory computer program product for using a robust transmission protocol comprising:
a computer-readable medium comprising codes executable by at least one computer to:
define robust transmission time period (RTTP) resources, said RTTP resources identifying a location of at least one RTTP slot of a plurality of RTTP slots in a transmission schedule, wherein the RTTP slots are defined as potential candidates during which an orthogonalization protocol could be executed;
modify a ratio of RTTP to non-RTTP slots in the transmission schedule based on a channel quality feedback signal; and
execute the orthogonalization protocol pursuant to the transmission schedule, wherein the orthogonlization protocol provides orthogonalization between transmissions corresponding to different apparatuses during the at least one RTTP slot.

36. A method for using a robust transmission protocol in a wireless communication environment, comprising:
receiving a robust transmission protocol; and
executing an orthogonalization protocol during one or more robust transmission time period (RTTP) slots defined by the robust transmission protocol as potential candidates during which the orthogonalization protocol could be executed, wherein the orthogonal protocol provides orthogonalization between transmissions corresponding to different apparatuses, and wherein a ratio of RTTP to non-RTTP slots is based at least in part on a channel quality feedback signal.

37. The method of claim 36, further comprising:
receiving a signal comprising reverse link interference indicator therein; and
activating the one or more RTTP slots for use associated with a reverse link transmission based on the reverse link interference indicator.

38. The method of claim 37, further comprising:
evaluating a signal strength at which the reverse link interference indicator is received; and
using the evaluated signal strength for the activation of the one or more RTTP slots.

39. The method of claim 37, further comprising monitoring the received signal to verify that the reverse link interference indicator is provided and the received signal is decodable.

40. The method of claim 37, further comprising adjusting a level of orthogonality for a reverse link transmission as a function of the signal strength of the reverse link interference indicator.

41. The method of claim 36, further comprising employing a designated subset of available carriers for a reverse link transmission during at least one RTTP slot.

42. The method of claim 41, further comprising continuing to employ the designated subset of available carriers for the reverse link transmission if the reverse link interference indicator is set by at least one access point that is not serving an access terminal.

43. An apparatus for using a robust transmission protocol in a wireless communication environment, comprising:
means for receiving a robust transmission protocol; and
means for executing an orthogonalization protocol during one or more robust transmission time period (RTTP) slots defined by the robust transmission protocol as potential candidates during which the orthogonalization protocol could be executed, wherein the orthogonal protocol provides orthogonalization between transmissions corresponding to different apparatuses, and wherein a ratio of RTTP to non-RTTP slots is based at least in part on a channel quality feedback signal.

44. An apparatus for using a robust transmission protocol in a wireless communication environment, comprising:
a receiver that receives a robust transmission protocol; and
a signal generator that executes an orthogonalization protocol during one or more robust transmission time period (RTTP) slots defined by the robust transmission protocol as potential candidates during which the orthogonalization protocol could be executed, wherein the orthogonal protocol provides orthogonalization between transmissions corresponding to different apparatuses, and wherein a ratio of RTTP to non-RTTP slots is based at least in part on a channel quality feedback signal.

45. The apparatus of claim 44, the receiver further receives a signal comprising reverse link interference indicator therein and the signal generator activates the one or more RTTP slots for use associated with a reverse link transmission based on the reverse link interference indicator.

46. The apparatus of claim 45, further comprising:
an indicator evaluator that evaluates a signal strength at which the reverse link interference indicator is received; and
the signal generator uses the evaluated signal strength for the activation of the one or more RTTP slots.

47. The apparatus of claim 45, the indicator evaluator further monitors the received signal to verify that the reverse link interference indicator is provided and the received signal is decodable.

48. The apparatus of claim 45, the signal generator adjusts a level of orthogonality for a reverse link transmission as a function of the signal strength of the reverse link interference indicator.

49. The apparatus of claim 44, the signal generator employs a designated subset of available carriers for a reverse link transmission during at least one RTTP slot.

50. The apparatus of claim 49, the signal generator continues to employ the designated subset of available carriers for the reverse link transmission if the reverse link interference indicator is set by at least one access point that is not serving the apparatus.

51. A non-transitory computer program product for using a robust transmission protocol in a wireless communication environment, comprising:
  a computer-readable medium comprising codes executable by at least one computer to:
    receive a robust transmission protocol; and
    execute a robust transmission protocol during one or more robust transmission time period (RTTP) slots defined by the robust transmission protocol as potential candidates during which the orthogonalization protocol could be executed, wherein the orthogonal protocol provides orthogonalization between transmissions corresponding to different apparatuses, and wherein a ratio of RTTP to non-RTTP slots is based at least in part on a channel quality feedback signal.

52. An access point, comprising:
  a receiver configured to receive a signal;
  a signal evaluator that defines robust transmission time period (RTTP) resources based on the received signal, said RTTP resources identifying a location of at least one RTTP slot of a plurality of RTTP slots in a transmission schedule, wherein the RTTP slots are defined as potential candidates during which an orthogonalization protocol could be executed; and
  a signal generator that executes the orthogonalization protocol pursuant to the transmission schedule, wherein the orthogonalization protocol provides orthogonalization between transmissions corresponding to the access point and at least one other access point during the at least one RTTP slot, wherein the signal generator further modifies a ratio of RTTP to non-RTTP slots in the transmission signal based on a channel quality feedback signal.

53. An access terminal, comprising:
  an antenna;
  a receiver that receives a robust transmission protocol via the antenna; and
  a signal generator that executes an orthogonalization protocol during one or more robust transmission time period (RTTP) slots defined by the robust transmission protocol as potential candidates during which the orthogonalization protocol could be executed, wherein the orthogonal protocol provides orthogonalization between transmissions corresponding to different access points, and wherein a ratio of RTTP to non-RTTP slots is based at least in part on a channel quality feedback signal.

* * * * *